United States Patent [19]

Kawamura et al.

[11] Patent Number: 4,947,095

[45] Date of Patent: Aug. 7, 1990

[54] EXPERT SYSTEM OF MACHINE TOOL EQUIPPED WITH NC UNIT

[75] Inventors: Hideaki Kawamura; Takao Sasaki, both of Tokyo; Takashi Endou, Yamanashi, all of Japan

[73] Assignee: Fanuc Ltd, Minamitsuru, Japan

[21] Appl. No.: 358,384

[22] PCT Filed: Sep. 22, 1988

[86] PCT No.: PCT/JP88/00965

§ 371 Date: May 17, 1989

§ 102(e) Date: May 17, 1989

[87] PCT Pub. No.: WO89/03073

PCT Pub. Date: Apr. 6, 1989

[30] Foreign Application Priority Data

Sep. 22, 1987 [JP] Japan .................................. 62-238273

[51] Int. Cl.$^5$ ............................................ G05B 19/18
[52] U.S. Cl. ................................. 318/569; 364/571.01
[58] Field of Search .................... 318/569; 364/571.01

[56] References Cited

U.S. PATENT DOCUMENTS 4,825,394  4/1989  Beamish ...................... 364/571.01

Primary Examiner—William M. Shoop, Jr.
Assistant Examiner—Saul M. Bergmann
Attorney, Agent, or Firm—Staas & Halsey

[57] ABSTRACT

Expert knowledge regarding investigation of the causes of various failures, and knowledge for extracting DI/DO information (IOD), which is exchanged by an NC unit (11) and a machine tool (13), as well as information (ITD) internally of the NC unit, is stored in a knowledge base (IB). When the contents of a failure are entered from an alarm detector (11g) upon occurrence of the failure, a reasoning mechanism (ADPR) uses the expert knowledge conforming to the failure to automatically extract the DI/DO information and information internally of the NC unit (IOD, ITB), ascertains actually occurring phenomena based on this information, recognizes the cause of the failure from these pheonomena, and displays the cause of the failure and a method of dealing with it.

5 Claims, 5 Drawing Sheets

FIG. 2

```
MACHINING CENTER M100 FAILURE DIAGNOSIS

SELECT PRESENT FAILURE FROM THE FOLLOWING

1. MACHINE DOES NOT OPERATE EVEN IF MANUAL
     HANDLE FEED IS APPLIED
  2. ATC DOES NOT OPERATE
  3. AUTOMATIC OPERATION WILL NOT START
  4. . . . . . . . . . . . . . . .
     . . . . . . . . . . . .
```

FIG. 3

```
MACHINING CENTER M100 FAILURE DIAGNOSIS

FAILURE: MACHINE DOES NOT OPERATE EVEN IF
         MANUAL HANDLE FEED IS APPLIED

RESPOND TO THE FOLLOWING TO INVESTIGATE
CAUSE

QUESTION 1: SELECT ONE OF THE FOLLOWING

1. NEITHER POSITION DISPLAY NOR MACHINE
     OPERATE
  2. POSITION DISPLAY OPERATES BUT MACHINE
     DOES NOT
```

FIG. 4

MACHINING CENTER M100 FAILURE DIAGNOSIS

FAILURE: MACHINE DOES NOT OPERATE EVEN IF
         MANUAL HANDLE FEED IS APPLIED

RESPOND TO THE FOLLOWING TO INVESTIGATE
CAUSE

QUESTION 2 : SELECT ONE OF THE FOLLOWING
   WHEN MANUAL PULSE GENERATOR IS TURNED, LED
   ON PRINTED CIRCUIT BOARD OF CNC

1. LIGHTS
   2. DOES NOT LIGHT

FIG. 5

MACHINING CENTER M100 FAILURE DIAGNOSIS

FAILURE: MACHINE DOES NOT OPERATE EVEN IF
         MANUAL HANDLE FEED IS APPLIED

CAUSE OF FAILURE IS AS FOLLOWS

CAUSE: OPERATION MODE SWITCH IS NOT SET
       TO MANUAL HANDLE FEED

REMEDY: CHECK OPERATION MODE SWITCH

IF OPERATION MODE SWITCH IS SET TO MANUAL
   HANDLE FEED, SWITCH MAY BE FAULTY.
   CONTACT NEAREST SERVICE CENTER
   IN SUCH CASE.

EXPERT SYSTEM OF MACHINE TOOL EQUIPPED WITH NC UNIT

DESCRIPTION

1. Technical Field

This invention relates to an expert system of a machine tool equipped with an NC unit and, more particularly, to an expert system for diagnosing failure of an NC unit or machine tool.

2. Background Art

In a machine tool equipped with an NC unit, the NC unit and machine tool undergo various alarm checks and self-diagnoses depending upon the respective category. In the NC unit, for example, various checks are performed, such as determining whether a machining command tape contains an error or whether a servo system is abnormal. If an anomaly occurs, an alarm is generated to so inform the operator.

In the machine tool also a number of checks are performed regarding the machine. For example, an axis-movement interlock is provided on the NC unit side in such a manner that an axis will not move if a spindle is not rotating at the start of cutting, and a lamp is lit to inform the operator of a malfunction.

Generally, when an alarm is generated, the operator is informed only of the contents of the alarm and not about its cause nor what measures to take. This means that the operator must consult a manual to determine the cause of the alarm and how to deal with it. However, since several conceivable causes of an alarm may be described in the manual, there are many cases in which the operator cannot determine the cause of a failure and its remedy in a simple and accurate manner.

By way of example, when the amount of offset of a servo system becomes excessive and a servo system alarm is issued during movement along an axis, all that is done is to inform the operator of an alarm by the message "ALARM OF EXCESSIVE SERVO SYSTEM OFFSET", so that the operator is left almost totally uninformed of the cause of the alarm. In other words, an alarm as used in the prior art generally does nothing more than inform the operator that the machine will be damaged and that subsequent processing will not be able to continue unless a check is made. Thus, the alarm is merely a precaution and gives almost no consideration to a rapid recovery from a failure.

As a consequence of the foregoing, downtime of a machine tool equipped with an NC unit is prolonged and the efficiency of the machining operation declines.

In a case where a number of causes of one alarm are conceivable, it would be possible to deal with a malfunction in an extremely timely fashion if it were possible to automatically deduce the cause of the malfunction based on a knowledge source (which refers to a collection of knowledge regarding a single phenomenon) for an alarm when the alarm is generated.

Accordingly, an object of the present invention is to provide an expert system of a machine tool equipped with an NC unit, in which an operator is rapidly informed of the cause of a failure when the failure occurs, thereby making it possible to minimize downtime. Specifically, the invention provides an expert system of a machine tool equipped with an NC unit wherein when an "EXCESSIVE SERVO SYSTEM OFFSET ALARM" is generated, by way of example, the operator is rapidly informed of the name of the alarm and the cause thereof, such as whether the alarm is due to a set value error in a parameter, a faulty servomotor or a faulty detector.

Another object of the present invention is to provide an expert system of a machine tool equipped with an NC unit, in which the cause of a failure is automatically investigated when the failure occurs and the operator is informed of the cause.

DISCLOSURE OF THE INVENTION

An expert system of a machine tool equipped with an NC unit in accordance with the present invention is provided with a knowledge base storing expert knowledge regarding investigation of the causes of various failures, and a reasoning mechanism for deducing the cause of a failure based on the expert knowledge stored in the knowledge base, wherein the knowledge base section further stores knowledge for extracting digital input/output information, which is exchanged by the NC unit and machine tool, as well as information internally of the NC unit, with the causes of failures in the NC unit and machine tool being investigated using the information automatically extracted when a failure occurs.

BRIEF DESCRIPTION OF THE DRAWINGS

FIGS. 2 through 5 are examples of conversational screens for diagnosing failures by the expert system, in which FIG. 2 is an example of a conversational display for inputting the details of a failure, FIGS. 3 and 4 are examples of conversational screens for inputting phenomena, and FIG. 5 is an example of a display showing the investigated cause of a failure;

BEST MODE FOR CARRYING OUT THE INVENTION

Figure 1:
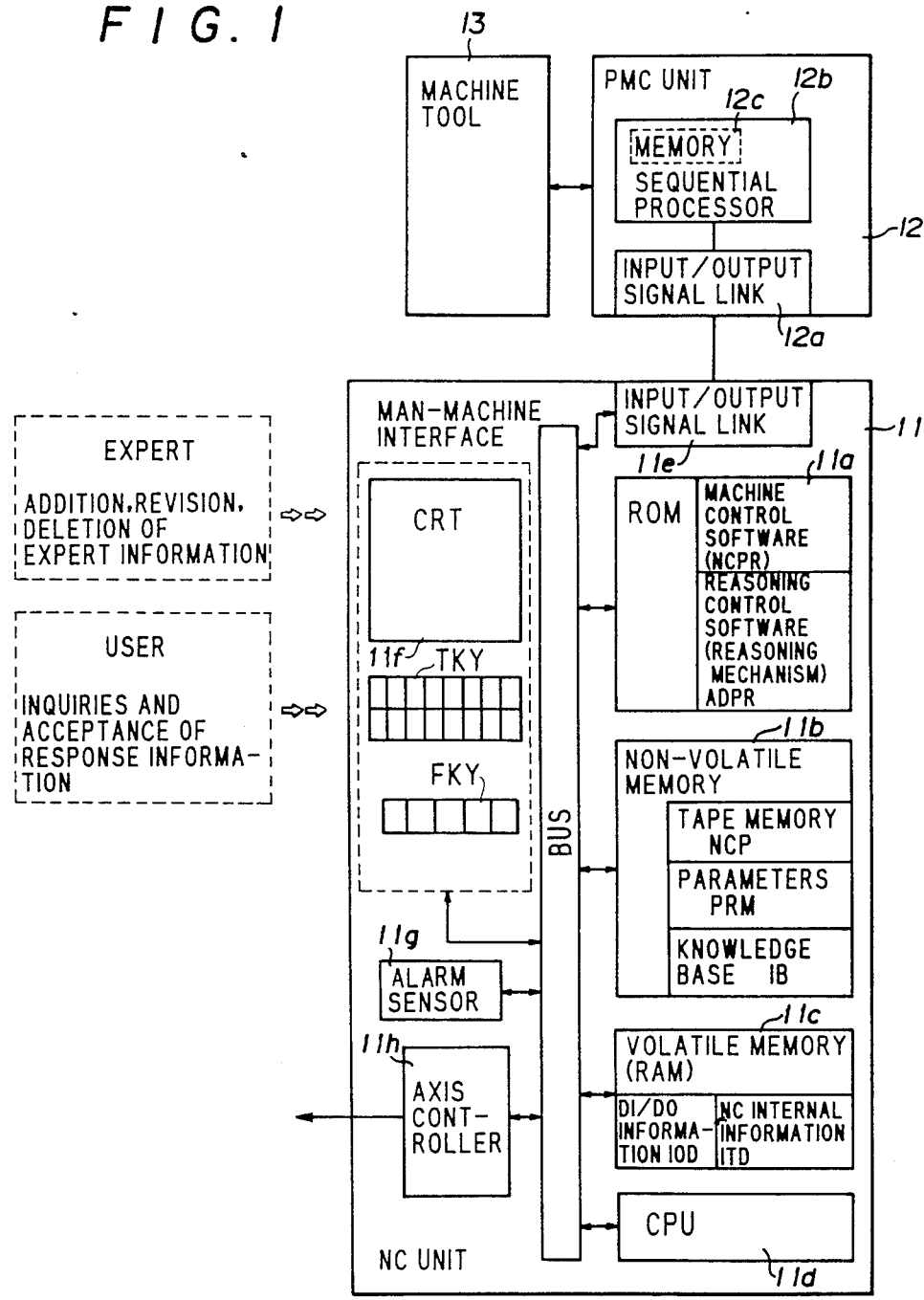
FIG. 1 is a block diagram of a machine tool equipped with an NC unit which includes an expert system according to the present invention.

FIG. 1 is a block diagram of a machine tool equipped with an NC unit which includes an expert system according to the present invention.

Numeral 11 denotes an NC unit (numerical control unit), 12 a PMC unit (programmable machine controller), and 13 a machine tool.

In the numerical control unit 11, numeral 11a denotes a ROM for storing a control program NCPR for numerical control and a control program (reasoning mechanism) ADPR for deducing the cause of a failure. Numeral 11b denotes a non-volatile memory (e.g., an IC memory backed up by a battery, or a hard disk) having a storage area NCP for storing various NC tapes (NC program data), a storage area PRM for storing parameters, and a knowledge base section IB which stores expert knowledge regarding investigations of the causes of various failures and the methods of dealing with these failures, and knowledge for judging phenomena following the reading of various information (this knowledge will be described below). Numerical 11c denotes a volatile memory (RAM) for storing NC data, parameters and the like read from the non-volatile memory 11b, as well as the internal status of the NC unit (information internally of the NC unit) ITD and various information IOD exchanged by the NC unit and the machine tool. Numeral 11d denotes a processor (CPU) for executing numerical control processing and processing for diagnosing the cause of a failure in accordance with the control program, 11e an input/output signal link section for performing an exchange of DI/DO (digital input/output) signals with the PMC unit 12, which executes sequence control, and 11f a man/machine interface constituted by a computer, not shown. The latter has a display unit CRT, which serves as conversational input means, a ten-key pad TKY, and function keys FKY. The man/machine interface converses with the reasoning mechanism when (i) expert knowledge is inputted to the knowledge base IB, deleted or modified, and (ii) failure phenomena are entered at the time of failure diagnosis, or the cause of a failure is taught.

Numeral 11g denotes an alarm sensor for sensing, and identifying the category of, various alarms on the NC unit side, such as an NC tape error, excessive servo system offset and operating error. The alarm sensor also refers to a DI signal (digital input signal) sent by the PMC unit 12 to sense, and identify the category of, abnormality and failure alarms generated on the machine side, such as shaft interlock. Numeral 11h denotes an axis controller, which includes a pulse distributing circuit and a servomotor circuit, for each controlled axis.

In the PMC unit 12, numeral 12a represents a inut-/output signal link for performing a DI/DO data exchange with the NC unit, and 12b a computerized sequential processor for executing processing in accordance with the sequence program. The sequence processor executes predetermined sequence processing based on signals from the NC unit 11 and machine tool 13 and outputs the results of processing to the NC unit and machine tool. The latest DI signals which enter from the NC unit 11 and machine tool 13 and the latest DO signals outputted to the NC unit and machine tool are stored in an internal memory 12c of the sequential processor 12b.

A failure diagnosing expert system is composed of the reasoning control program stored in ROM 11a, the knowledge base IB and the man-machine interface 11f serving as the conversational input means. The expert system referred to here is a system in which the knowledge possessed by an expert is stored in a computer and processes similar to the judging and reasoning processes performed by an expert based on this knowledge are implemented by the computer, whereby information desired to be obtained by a user is provided by the system acting in place of the expert.

Described hereinbelow will be a case in which the cause of a failure is investigated while a conversation is had with the reasoning mechanism ADPR, and a case in which the cause of a failure is investigated automatically. The description will be rendered taking as an example a diagnosis for a failure "MACHINE DOES NOT OPERATE EVEN IF MANUAL HANDLE FEED IS APPLIED". It will be assumed that there are just three possible causes of this failure, namely:

Cause 1: the operation mode switch is not in the manual handle feed position;

Cause 2: a machine lock switch is on; and

Cause 3: pulses are not generated by a manual pulse generator because of a malfunction in the pulse generator itself or in a cable.

(a) When cause of a failure is investigated conversationally

In order to specify which of the abovementioned three causes of failure is the true cause, the expert knowledge (know-how) for inquiring into the cause is stored beforehand in the knowledge base IB. For example, the following rules having the format

"IF—THEN—"

and referred to as "production rules" are stored as expert knowledge in the knowledge base IB in a data format readily processed by computer:

Rule 1
IF "neither position display nor machine operate" and "LED on NC unit printed circuit board lights when manual pulse generator is turned",
THEN "Cause 1".

Rule 2
IF "position display does not operate but machine does",
THEN "Cause 2".

Rule 3
IF "neither position display nor machine operate" and "LED on NC unit printed circuit board does not light when manual pulse generator is turned",
THEN "Cause 3".

When, under these conditions, the machine does not operate even when manual handle feed is applied, the operator presses a predetermined function key on the man-machine interface 11f to start failure diagnosis of the expert system.

In response, all of the preconceived failures are displayed on the CRT, as shown in FIG. 2. Accordingly, the number corresponding to the failure presently occurring is entered from the ten-key pad TKY. In this example, the numerical value "1" is entered from the ten-key pad TKY to input the failure "MACHINE DOES NOT OPERATE EVEN IF MANUAL HANDLE FEED IS APPLIED".

In response to the entry of the failure, the reasoning mechanism operates and attempts to inquire into the cause based on the knowledge base conforming to the failure. However, as will be understood from Rules 1–3, a check must be performed to determine which rule condition (the condition from "IF" to "THEN") holds in order to discover the cause. This is carried out by prompting the operator. That is, in order for the reasoning mechanism ADPR to determine which rule condition is satisfied, prompts regarding the particular phenomenon appear as shown in FIG. 3.

In response, if the operator selects "1. NEITHER POSITION DISPLAY NOR MACHINE OPERATE", the reasoning mechanism ADPR deduces that the cause is one of the Causes 1 through 3, after which a prompt regarding a different phenomenon appears as shown in FIG. 4.

If the operator now selects "1. LIGHTS", then the condition of Rule 1 is satisfied. Consequently, the reasoning mechanism ADPR judges that the cause of the failure is "Cause 1" and the result of this decision is displayed, as shown in FIG. 5.

If the operator selects "2. DOES NOT LIGHT" in response to Question 2 on the conversional screen of FIG. 4, then this means that the condition of Rule 3 is satisfied. Accordingly, the reasoning mechanism ADPR judges that the cause of the failure is "Cause 3", and the result of this decision is displayed on the CRT. If "2. POSITION DISPLAY OPERATES BUT MACHINE DOES NOT" is selected in response to Question 1 on the conversational screen of FIG. 3, the reasoning mechanism ADPR judges from Rule 2 that the cause of the failure is "Cause 2" based solely on prompt of Question 1, and the result of this decision is displayed on the CRT.

Figure 6:
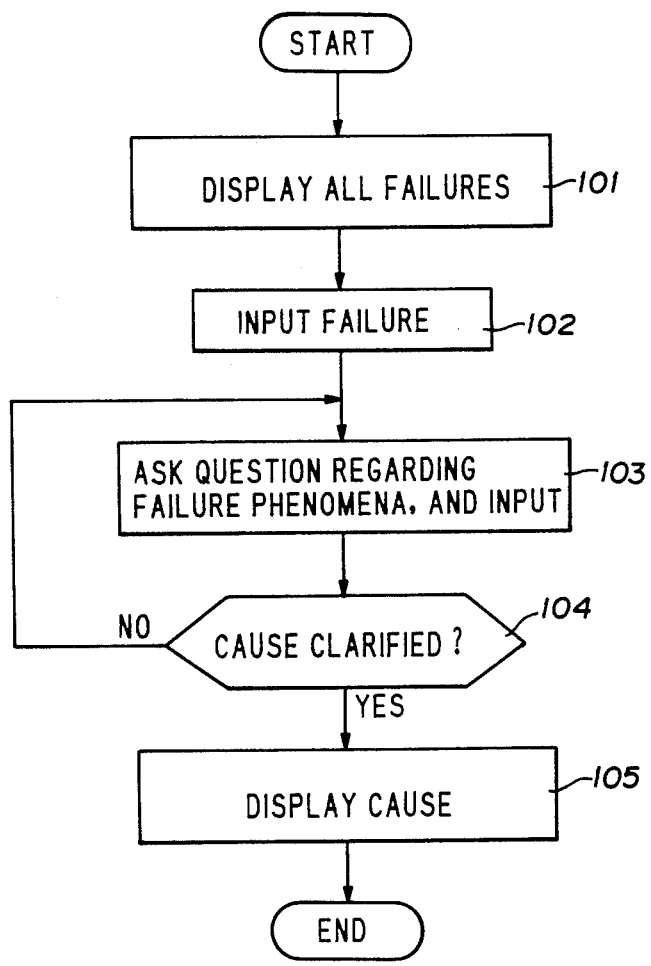
FIG. 6 is a flowchart of failure diagnosis processing by a reasoning mechanism which investigates the cause of a failure using the details of a failure and phenomena entered conversationally.

FIG. 6 if a flowchart of failure diagnosis processing performed by the reasoning mechanism ADPR. When a failure occurs and investigation of the cause is requested, the reasoning mechanism ADPR displays the details of all failures on the CRT (step 101) and allows input of the failure that has actually occurred (step 102).

When failure is entered, the reasoning mechanism ADPR inquires into the phenomena concerning the inputted failure based on the knowledge base IB and allows input of phenomena (step 103).

When a phenomenon is entered, the reasoning mechanism ADPR judges the cause. In other words, the ADPR checks to see if the condition of a predetermined production rule is satisfied (step 104).

If the cause is still not clarified, the program returns to step 103 to allow entry of another phenomenon. If the cause is clarified, the cause and the method of dealing with it are displayed on the CRT (step 105) and processing is ended.

(b) When cause of a failure is investigated automatically

In the foregoing case, the reasoning mechanism ADPR retrieves causes successively based on the data entered by the operator in response to prompts, whereby the cause of a failure and the method of dealing with it are eventually obtained. However, an arrangement can be adopted in which all of the phenomena in the IF statements of the rules can be recognized automatically to enable the cause of a failure to be investigated without using prompts.

Specifically, knowledge which has the ability to extract (i) various information (DI/DO signals) IOD exchanged by the NC unit and machine tool and (ii) NC internal information ITD and, moreover, which utilizes the information ITD and DI/DO signals to discern which of the phenomena in the IF statements of the rules is actually occurring, is stored in the knowledge base IB. When an alarm category is sensed by the alarm sensor 11g, the reasoning mechanism ADPR immediately begins operating to recognize the phenomenon necessary for investigating the cause of a failure based on the abovementioned knowledge. Based on the phenomenon, the ADPR eventually investigates the cause of the failure and displays it on the CRT of the man-machine interface 11f.

The following is an example in which a knowledge base uses the function (arithmetic function) for extracting the DI/DO signals and NC internal information IDT. It is assumed that the failure phenomenon is "MACHINE DOES NOT OPERATE EVEN IF MANUAL HANDLE IS TURNED".

Rule 1 IF "GETMODE NEQ HANDLE"
    THEN "CAUSE 1"
Rule 2 IF 37 GETDI (MLK) EQ 1"
    THEN 37 CAUSE 2"
Rule 3 IF "TESTHANDLE EQ 1"
    THEN "CAUSE 3"

Specifically, it is arranged so that a function can be used in the knowledge base, and so that various information (DI/DO signals) IOD, which is exchanged by the machine side and the NC unit, and NC internal information ITD are extracted depending upon the function.

The function GETMODE in the above example is a function which extracts and identifies the presently selected operating mode. The phenomenon "OPERATING MODE IS NOT MANUAL HANDLE FEED" is indicated by IF "GETMODE NEQ HANDLE". It should be noted that since a predetermined address and a predetermined bit of the RAM 11c are assigned to the handle mode, whether the prevailing mode is the handle mode can be recognized based on a bit content of "1" or "0". Operation is similar also with regard to extraction of the NC internal information ITD.

GETDI is a function which reads the DI signal (digital input signal). GETDI(MLK) is a function for reading a DI signal MLK, which indicates machine lock switch on/off. The phenomenon "MACHINE LOCK IS '1'" (machine lock is in effect) is indicated by IF "GETDI (MLK) EQ 1". It should be noted that since a predetermined address and a predetermined bit of the RAM 11c are assigned to machine lock, whether or not machine lock is in effect can be recognized based on a bit content of "1" or "0". Operation is similar also with regard to the DI/DO information IOD.

TESTHANDLE is a function which tests for malfunction in a manual pulse generating circuit (of course, a mechanism must be provided for diagnosing the malfunction in the manual pulse generating circuit). The phenomenon "MANUAL PULSE GENERATING CIRCUIT IS MALFUNCTIONING" is indicated by IF "TESTHANDLE EQ 1".

In order to determine the cause of a failure such as breakage or shorting of a cable, the three rules mentioned above are inadequate. Therefore, it is necessary to separately provide a mechanism which checks for cable breakage or shorting, provide a function for discriminating cable breakage or shorting by operating the mechanism, formulate a rule using this function and store the rule as a knowledge base.

Figure 7:
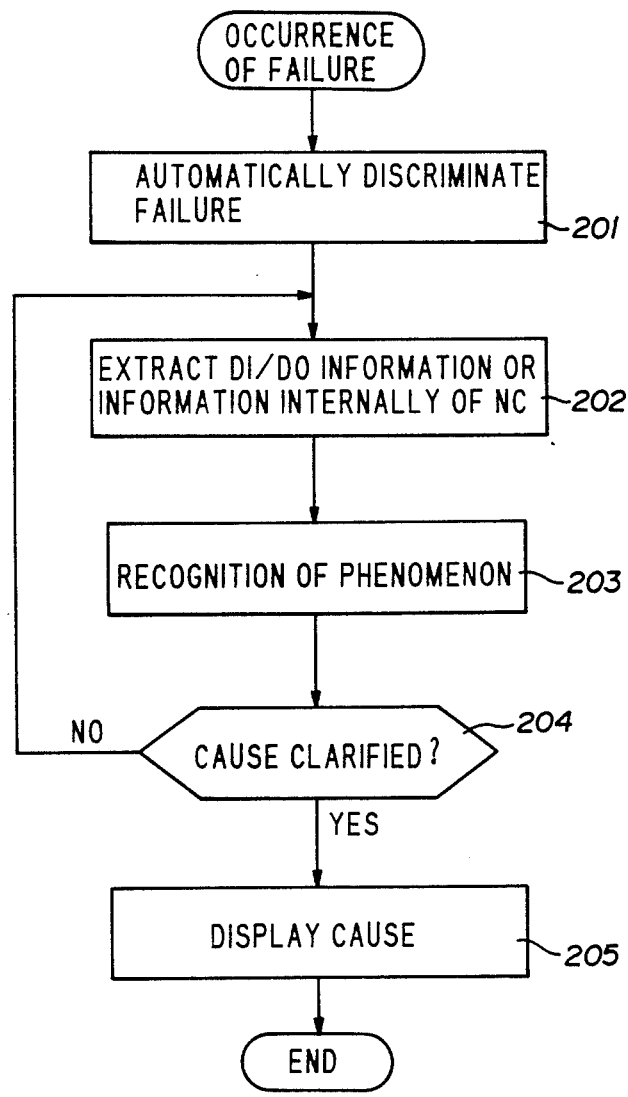
FIG. 7 is a flowchart of the processing of a reasoning mechanism which investigates the cause of a failure upon automatically recognizing the details of a failure and phoneomena.

FIG. 7 is a flowchart of processing performed by the reasoning mechanism ADPR in a case where the cause of a failure is investigated automatically.

When a failure occurs, the alarm sensor 11g senses the occurrence of the failure to start the reasoning mechanism ADPR. In response, the reasoning mechanism ADPR reads the failure from the alarm sensor 11g (step 201), implements a function for extracting information in an i-th production rule (the initial value of i is 1), which is stored in the knowledge base IB, in accordance with the type of failure, extracts predetermined DI/DO information or NC internal information (step 202) and subsequently recognizes the actually occurring pheonomenon based on the extracted information (step 203).

Next, a check is made to determine whether the cause of the failure has been clarified from all of the phenomena automatically discriminated so far (step 204). If the cause has been clarified, the cause and the method of dealing with it are displayed on the CRT (step 205) and diagnostic processing is ended. If the cause has not been clarified, the operation i+1→i is performed and processing from step 202 onward is repeated with regard to the next i-th production rule to eventually recognize the cause of the failure.

In the foregoing case, it is so arranged that all phenomena in all of the IF statements of all rules can be recognized automatically, and so that the categories of alarm can also be sensed automatically by the alarm sensor. However, it is also possible to adopt an arrangement in which only some of the phenomena are automatically recognized, wherein phenomena that cannot be recognized are entered by the operator conversationally, or wherein categories of alarm are entered by the operator.

In accordance with the invention as set forth above, the arrangement is such that knowledge, which has the ability to extract various information exchanged by an NC unit and a machine tool as well as information internally of the NC unit, is stored in a knowledge base, and a failure is automatically diagnosed based on information automatically extracted by the knowledge. As a result, the cause of a failure is displayed immediately after the failure phenomena are entered or through a minimum number of prompts. This makes it possible to greatly shorten the downtime of a machine tool equipped with an NC unit.

We claim:

1. An expert system of a machine tool equipped with an NC unit, characterized by provision of a knowledge base storing expert knowledge regarding investigation of causes of various failures, a reasoning mechanism for deducing the cause of a failure based on the expert knowledge stored in the knowledge base, and conversational means for inputting the expert knowledge to the knowledge base, deleting and modifying the expert knowledge, and for conversing with the reasoning mechanism when failure diagnosis is performed;

wherein the knowledge base stores knowledge for extracting digital input/output information, which is exchanged by the NC unit and the machine tool, as well as information internally of the NC unit;

the reasoning mechanism discriminating the causes of failures in the NC unit and machine tool based on said information automatically extracted by said expert knowledge when a failure occurs.

2. An expert system of a machine tool equipped with an NC unit according to claim 1, characterized in that said expert knowledge includes data indicative of a correlation between several conceivable causes of a single failure and phenomena which actually occur in respective ones of the said causes.

3. An expert system of a machine tool equipped with an NC unit according to claim 2, characterized in that the reasoning mechanism discriminates actually occurring phenomena based on said extracted input/output information or information internally of the NC unit, and discriminates the cause of a failure based on said phenomena.

4. An expert system of a machine tool equipped with an NC unit according to claim 3, characterized by having an alarm detector for discriminating a failure which occurs during operation of the machine tool equipped with the NC unit, wherein the reasoning mechanism discriminates the cause of a failure based on expert knowledge conforming to said discriminated failure.

5. An expert system of a machine tool equipped with an NC unit according to claim 1, characterized in that the cause of a failure is discriminated upon adding a conversationally inputted phenomenon to said automatically discriminated phenomena.

* * * * *